P. BROWN & F. J. BOSTOCK.
MACHINE OR APPARATUS FOR TESTING WORMS AND WORM WHEELS.
APPLICATION FILED OCT. 8, 1913.
1,122,069.
Patented Dec. 22, 1914.
4 SHEETS—SHEET 2.
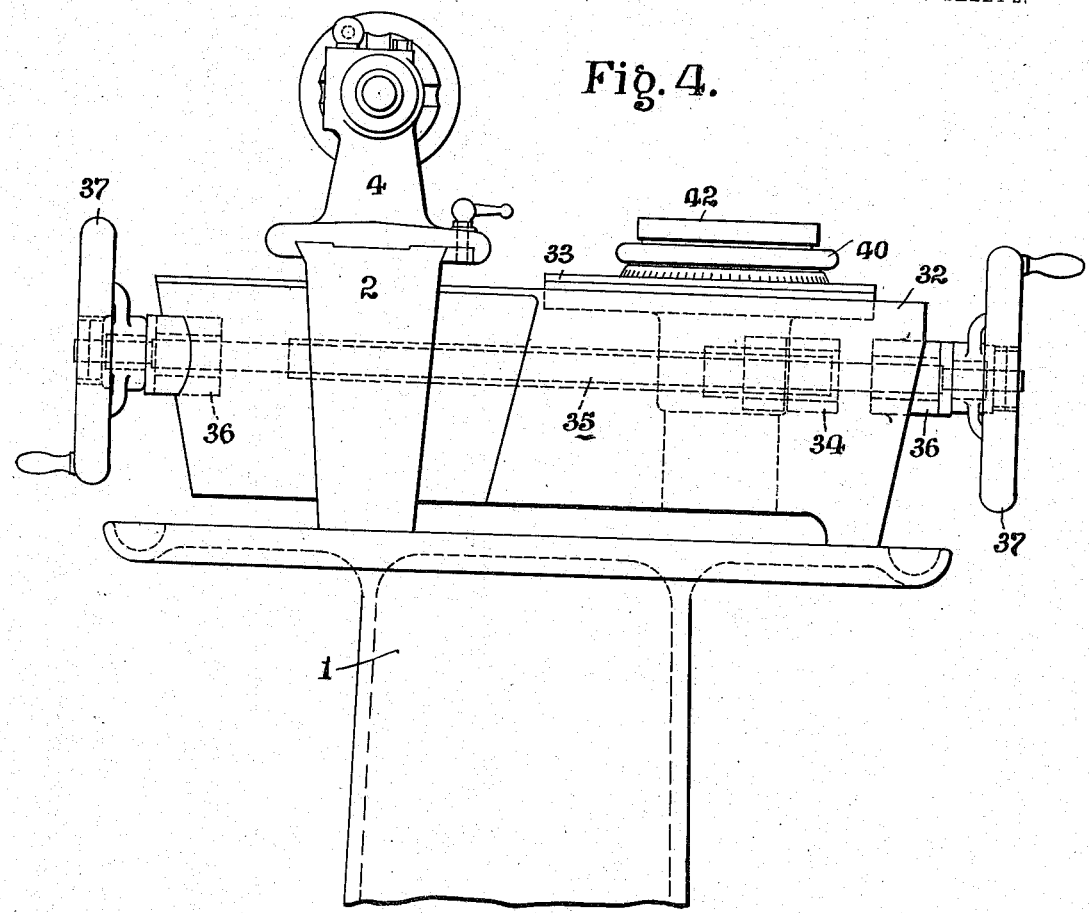
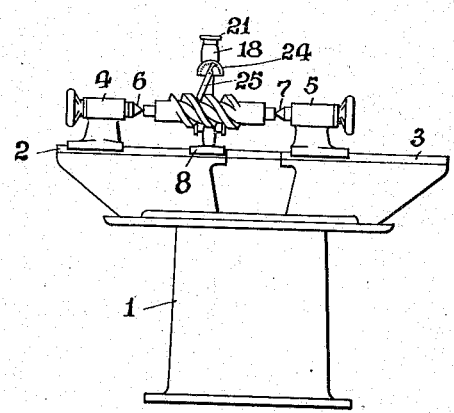
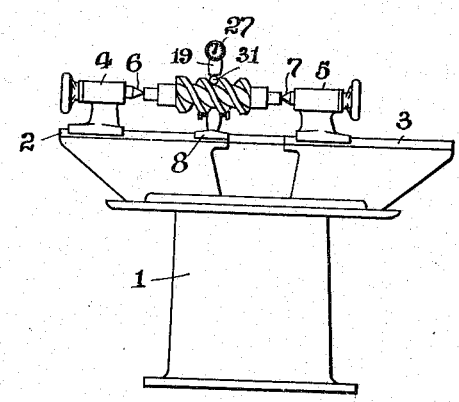

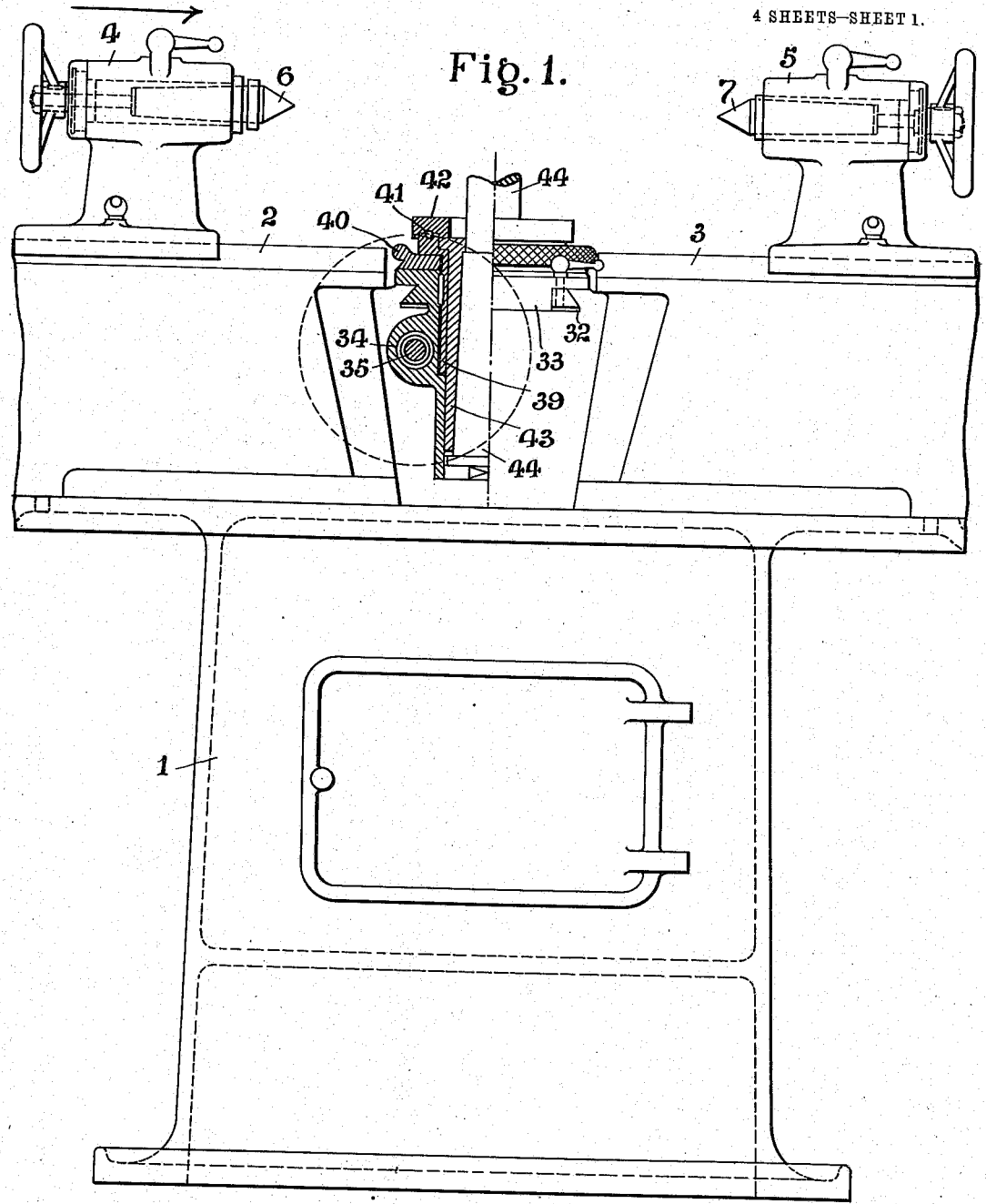

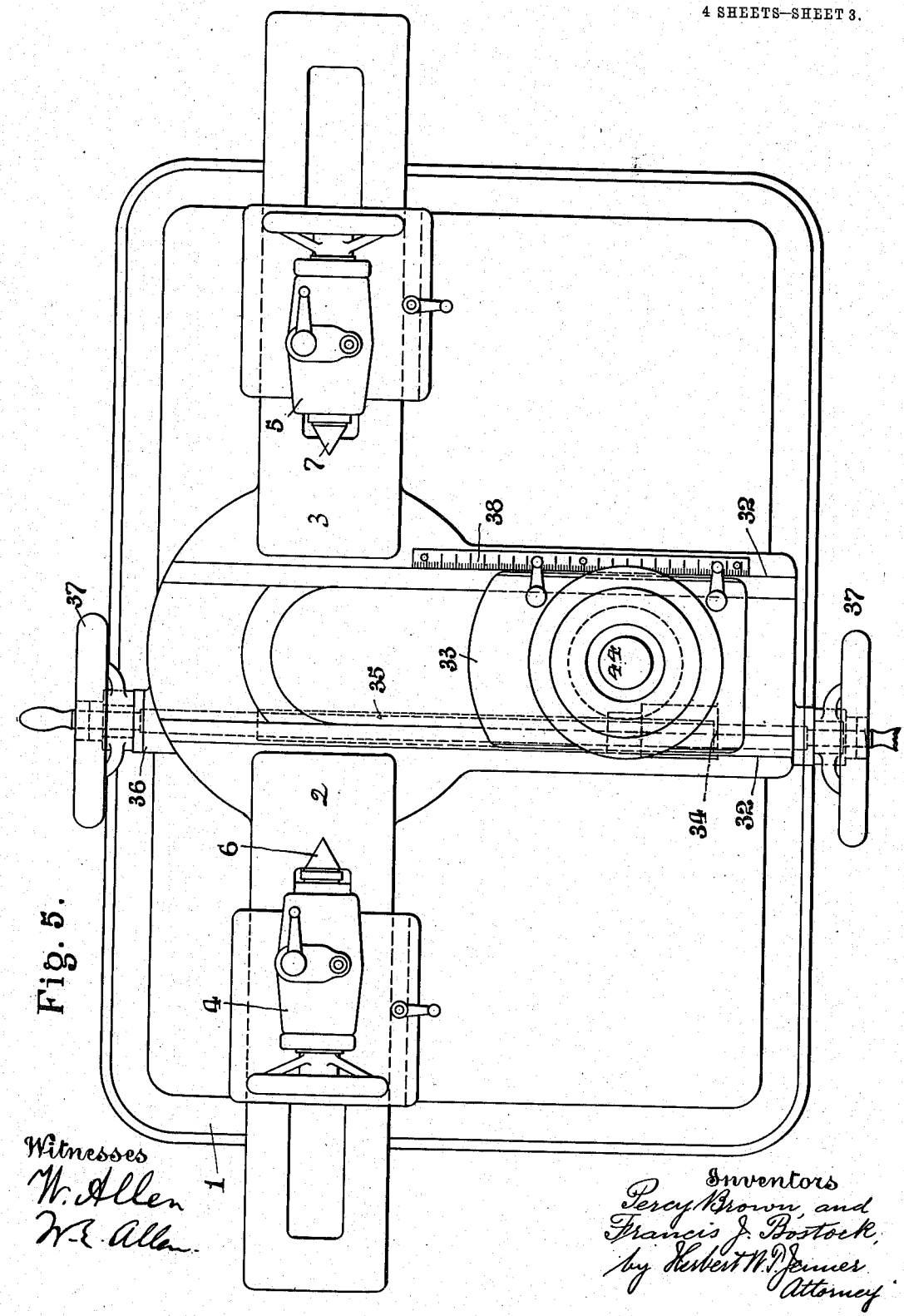

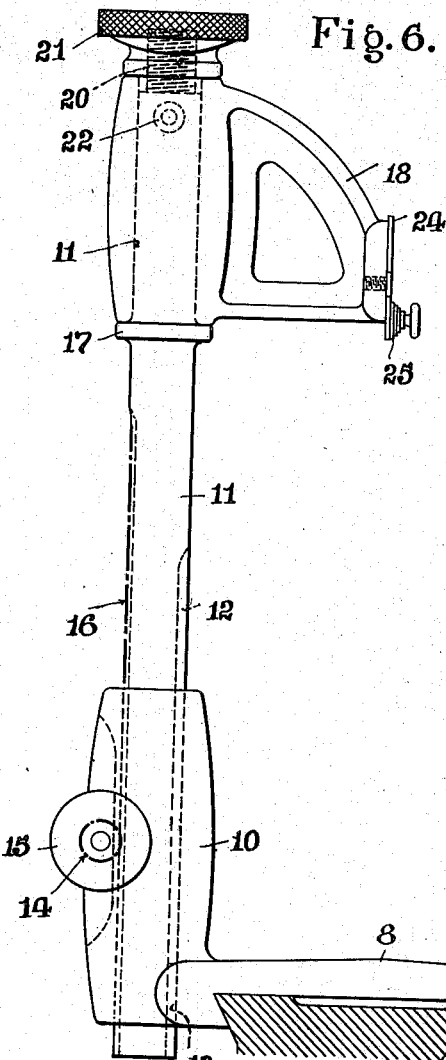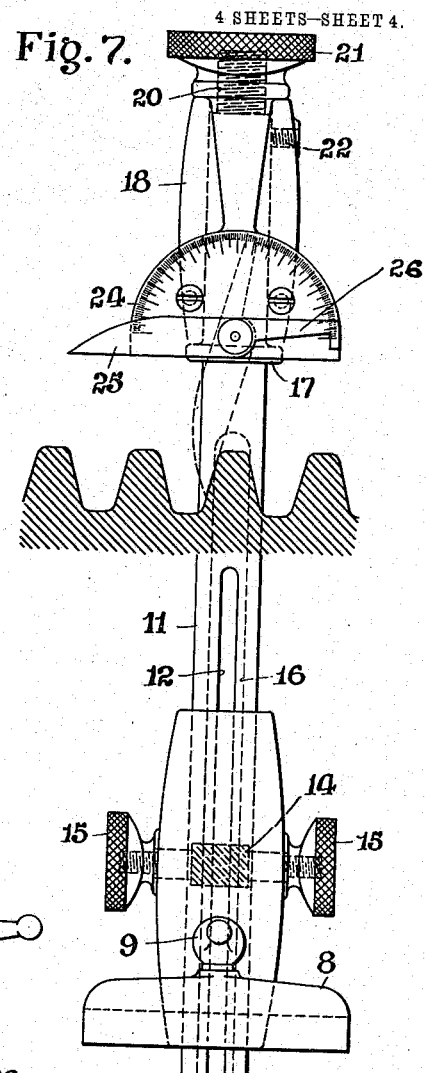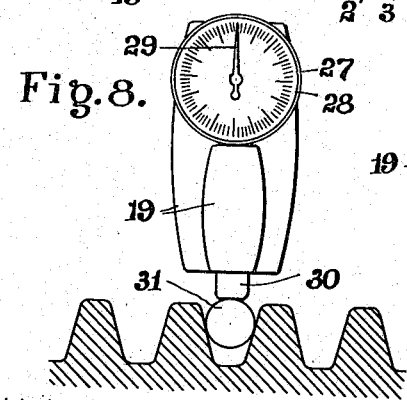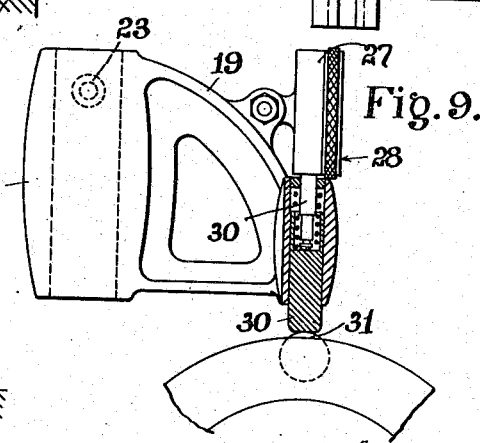

UNITED STATES PATENT OFFICE.

PERCY BROWN AND FRANCIS JOHN BOSTOCK, OF HUDDERSFIELD, ENGLAND.

MACHINE OR APPARATUS FOR TESTING WORMS AND WORM-WHEELS.

1,122,069.  Specification of Letters Patent.  Patented Dec. 22, 1914.

Application filed October 8, 1913. Serial No. 794,048.

*To all whom it may concern:*

Be it known that we, PERCY BROWN and FRANCIS JOHN BOSTOCK, subjects of King George V of Great Britain, residing at Huddersfield, in the county of York, England, have invented certain new and useful Improvements in Machines or Apparatus for Testing Worms and Worm-Wheels, of which the following is a specification.

Our invention relates to the testing of worms and worm wheels to ascertain their accuracy, and consists in the provision of a new or improved machine or apparatus by means of which an effective and reliable test of the accuracy of a worm, and of worm wheels to work therewith, may be obtained.

Our improved machine or apparatus, and the manner in which the same is to be employed will be described with reference to the accompanying drawings in which:—

Figure 1 is a front view partly in section, showing the general arrangement of the machine; Fig. 2 is a front view on a smaller scale showing the testing of the accuracy of the thread of a worm after hardening and stretching, Fig. 3 is a similar view to Fig. 2, showing the testing of the pressure angle of the worm thread; Fig. 4 is an end view, looking in the direction of the arrow A, Fig. 1; Fig. 5 is a plan view; Figs. 6 and 7 are respectively a side and a front view, on a large scale, of the portion of the apparatus for testing the pressure angle of a worm, and Figs. 8 and 9 are details of the portion of the apparatus for testing the accuracy of a worm thread.

Referring to the drawings, the machine comprises a suitable pedestal or base 1 having two longitudinally extending slides 2 and 3, on which are mounted headstocks 4 and 5 having centers 6 and 7 between which the worm to be tested is supported as shown at Figs. 2 and 3.

A saddle 8 Fig. 2 adapted to be adjustably secured in any desired position on either of the slides 2 or 3 by means of a clamping screw 9 Fig. 6, has a vertical boss 10 through which passes a vertical spindle 11 having a keyway 12 into which enters a key 13 in the boss 10. The spindle 11 is thus capable of vertical movement but is prevented from having any rotary movement. Mounted in bearings in the boss 10 is a worm or a pinion 14, the spindle of which has fast thereon the milled disks 15, 15, and this worm or pinion meshes with a rack 16 on the vertical spindle 11. Rotation of the worm, in one direction or the other, will cause the spindle to be raised or lowered, as will be understood.

Toward its upper end the spindle 11 has a collar 17 made integral with or secured to it and this collar is adapted to support on the spindle either a bracket 18, Figs. 6 and 7, or a bracket 19, Figs. 8 and 9, each of the said brackets having a bored boss adapted to fit over the portion of the spindle 11 above the collar 17. The upper end of the spindle 11 is screwed as at 20 and is provided with a nut 21 by means of which either of the brackets 18 or 19 may be secured in position on the spindle. Rotary movement of a bracket around the spindle is prevented by a set screw 22 or 23.

The bracket 18 carries a protractor plate 24 and a pivoted blade or pointer 25 provided with a portion 26 carrying an indicating mark so disposed that when the edge of the blade or pointer is laid against the flank of a worm thread the indicating mark will indicate, on the protractor plate, the correct angle of inclination of the thread. The blade or pointer 25 is made heavier than the arm 26 so that the said blade or pointer will always tend to fall and thus remain in contact with the flank of the thread as the worm is revolved.

The bracket 19 (Figs. 8 and 9) carries a gage 27 of suitable construction provided with a suitably divided disk 28 over which a pointer 29 is movable by means of a spring plunger 30.

After having been hardened and stretched, the worm to be tested is supported between the centers 6 and 7 of the adjustable head-stocks 4 and 5, and the accuracy of the thread is first ascertained. This is effected as follows:—A truly spherical ball 31 of suitable diameter held in a suitable tool or holder not shown, is placed in a space of the worm as shown at Fig. 8, and the bracket 19 is secured on the spindle 11 with the plunger 30 resting on the ball 31. The spindle 11 is adjusted vertically by means of the worm 14, Fig. 6, until the pointer 29 is opposite zero on the dial 28, and the worm is then slowly rotated by hand. As the worm thread is traversed past the ball any irregularity or inaccuracy in the thread will permit the ball to enter more deeply into the thread space or will cause it to move outwardly toward the points of the thread, and any such movement will be transmitted by the spring plunger 30 to the pointer 29 which will indicate on the dial 28 the amount of inaccuracy and according to which side of the zero mark the pointer is moved, will indicate the nature of the inaccuracy. When each space in the worm has been thus tested, the bracket 19 is removed from the spindle 11 and the bracket 18 placed in position thereon. The pressure angle of the worm is now tested, as shown at Fig. 7, one face of each thread being tested, after which the worm is reversed in the centers and the opposite faces of the threads tested. In place of a ball a cylindrical test bar may be laid in the angle of the thread space for the plunger 30 to rest upon or alternatively the lower end of the plunger may itself be suitably constructed to ride in the thread space and the use of a ball or test bar be dispensed with.

To enable worm wheels to be tested the base 1 has a slide 32 in which is mounted a bracket 33 having a nut bearing 34 through which passes a traverse screw 35 supported in bearings 36, 36, in the bed and provided at each end with an operating hand wheel 37. A scale 38 carried by the bed facilitates accurate positioning of the bracket 33. The bracket 33 has an externally screwed sleeve 39 Fig. 1 whose vertical position can be adjusted by a micrometer nut 40 Fig. 4 and the sleeve 39 supports, on a ball bearing 41 at its upper end, a worm wheel supporting plate 42 having a depending sleeve 43 extending down within the sleeve 39. A fixed centering spindle 44 extends up within the sleeve 43.

The worm wheel to be tested is placed upon the spindle 44 and rests loosely upon the supporting plate 42. By means of the traverse screw 35, the bracket 33 is moved toward the worm which is supported between the headstocks 4 and 5, until the scale 38 indicates that the correct distance between the axis of the worm and the center of the spindle 44 is reached. The worm wheel is then adjusted vertically by means of the micrometer device 40 until its center is in horizontal alinement with the axis of the worm. The latter, which has preferably been already tested as before described and any inaccuracies corrected, is then slowly rotated by hand, and carries the worm wheel gradually around, the correctness of the meshing being ascertained by the operator in the usual way. By the means above set forth, the worm and worm wheel can be accurately set in the exact relative positions they are to occupy when at work, and correction of any inaccuracies in the worm wheel is facilitated.

The details of construction and arrangement of the apparatus may be varied.

Having thus described our invention, what we claim as new and desire to secure by Letters Patent is:—

1. In a machine for testing worm gearing, the combination, with means for revolubly supporting a worm, of a support adjustable crosswise of the axis of the worm, a sleeve carried by the said support and adjustable in a plane at a right angle to the plane in which the support is adjustable, and a revoluble plate for supporting a worm wheel in gear with the worm, said plate being provided with a centering spindle and a sleeve which is journaled in the aforesaid sleeve.

2. In a machine for testing worm gearing, the combination, with a base, and two headstocks mounted thereon and provided with centers between which the worm is supported; of a bracket mounted on the said base and adjustable crosswise of the headstocks, a vertically adjustable sleeve carried by the said bracket, and a revoluble plate for supporting a worm-wheel in gear with the said worm, said plate being provided with a centering spindle and a sleeve which is journaled in the aforesaid sleeve.

3. A machine for testing worm gearing, comprising a base, two headstocks mounted thereon and provided with centers between which the worm is supported, a saddle mounted on the base and provided with a vertical spindle, devices for testing the worm engaging interchangeably with the said vertical spindle, and a support for holding a worm-wheel in gear with the said worm, said support being mounted on the said base and provided with means for adjusting the position of the worm-wheel vertically and also in a horizontal plane crosswise of the headstocks.

In testimony whereof we affix our signatures in the presence of two witnesses.

PERCY BROWN.
FRANCIS JOHN BOSTOCK.

Witnesses:
H. WHITELEY,
C. E. HINCHLIFF.